US012585165B2

(12) United States Patent
Wu et al.

(10) Patent No.: US 12,585,165 B2
(45) Date of Patent: Mar. 24, 2026

(54) OPTICAL ELEMENT DRIVING MECHANISM

(71) Applicant: TDK TAIWAN CORP., Taoyuan (TW)

(72) Inventors: Ya-Hsiu Wu, Taoyuan (TW); Yi-Ho Chen, Taoyuan (TW); Ying-Jen Wang, Taoyuan (TW)

(73) Assignee: TDK TAIWAN CORP., Taoyuan City (TW)

( * ) Notice: Subject to any disclaimer, the term of this patent is extended or adjusted under 35 U.S.C. 154(b) by 433 days.

(21) Appl. No.: 18/089,075

(22) Filed: Dec. 27, 2022

(65) Prior Publication Data

US 2023/0205048 A1      Jun. 29, 2023

Related U.S. Application Data

(60) Provisional application No. 63/266,034, filed on Dec. 27, 2021.

(51) Int. Cl.
| | |
|---|---|
| *G03B 5/00* | (2021.01) |
| *G02B 7/08* | (2021.01) |
| *G02B 26/08* | (2006.01) |
| *G02B 27/00* | (2006.01) |
| *G02B 27/64* | (2006.01) |
| *H02K 41/035* | (2006.01) |

(Continued)

(52) U.S. Cl.
CPC ................. *G03B 5/00* (2013.01); *G02B 7/08* (2013.01); *G02B 26/08* (2013.01); *G02B 27/0006* (2013.01); *G02B 27/646* (2013.01); *H04N 23/55* (2023.01); *H04N 23/6812* (2023.01); *H04N 23/687* (2023.01); *G03B 2205/0015* (2013.01); *G03B 2205/0069* (2013.01); *H02K 41/0354* (2013.01); *H04N 23/51* (2023.01)

(58) Field of Classification Search
CPC .......... B60S 1/56; H04N 23/51; H04N 23/55; H04N 23/687; H04N 23/6812; B08B 7/028; B06B 1/06; H02K 41/0354; H05B 3/84; G02B 27/646; G02B 27/642; G02B 27/0006; G02B 27/08; G02B 5/005; G02B 26/08; G03B 2205/0069; G03B 2205/0015; G03B 5/00
USPC ....................................................... 359/554
See application file for complete search history.

(56) References Cited

U.S. PATENT DOCUMENTS

| | | | | |
|---|---|---|---|---|
| 1,171,996 A | * | 2/1916 | Hu | ............................ B67B 3/02 53/302 |
| 11,934,034 B2 | * | 3/2024 | Fan | .......................... G03B 3/00 |

(Continued)

FOREIGN PATENT DOCUMENTS

| | | |
|---|---|---|
| CN | 215416061 U | 1/2022 |
| WO | WO-2020129747 A1 * | 6/2020 |

OTHER PUBLICATIONS

Chinese Office Action cited in corresponding Application No. 202223498723.8, issued on May 11, 2023, 2 pages.

*Primary Examiner* — William R Alexander
*Assistant Examiner* — Andrew R Wright
(74) *Attorney, Agent, or Firm* — MUNCY, GEISSLER, OLDS & LOWE, P.C.

(57) ABSTRACT

An optical element driving mechanism used for driving an optical element is provided. The optical element driving mechanism includes a fixed portion and a support assembly. The optical element is movable in a first dimension relative to the fixed portion through the support assembly.

19 Claims, 9 Drawing Sheets

(51) Int. Cl.
 *H04N 23/51* (2023.01)
 *H04N 23/55* (2023.01)
 *H04N 23/68* (2023.01)

(56) References Cited

U.S. PATENT DOCUMENTS

| | | | |
|---|---|---|---|
| 2009/0109512 A1* | 4/2009 | Park | G02B 26/0833 |
| | | | 359/198.1 |
| 2019/0011950 A1* | 1/2019 | Shaw | H01F 7/0205 |
| 2019/0227200 A1* | 7/2019 | Kao | G02B 13/0075 |
| 2020/0249415 A1* | 8/2020 | Wang | G03B 9/36 |
| 2020/0249424 A1* | 8/2020 | Ho | H02K 41/0356 |
| 2020/0363602 A1* | 11/2020 | Huang | G02B 7/10 |
| 2021/0278689 A1* | 9/2021 | Kasahara | H02K 41/0356 |
| 2022/0019087 A1* | 1/2022 | Minamisawa | G03B 5/06 |

* cited by examiner

100

210

400

300

500

220

Z

X

Y

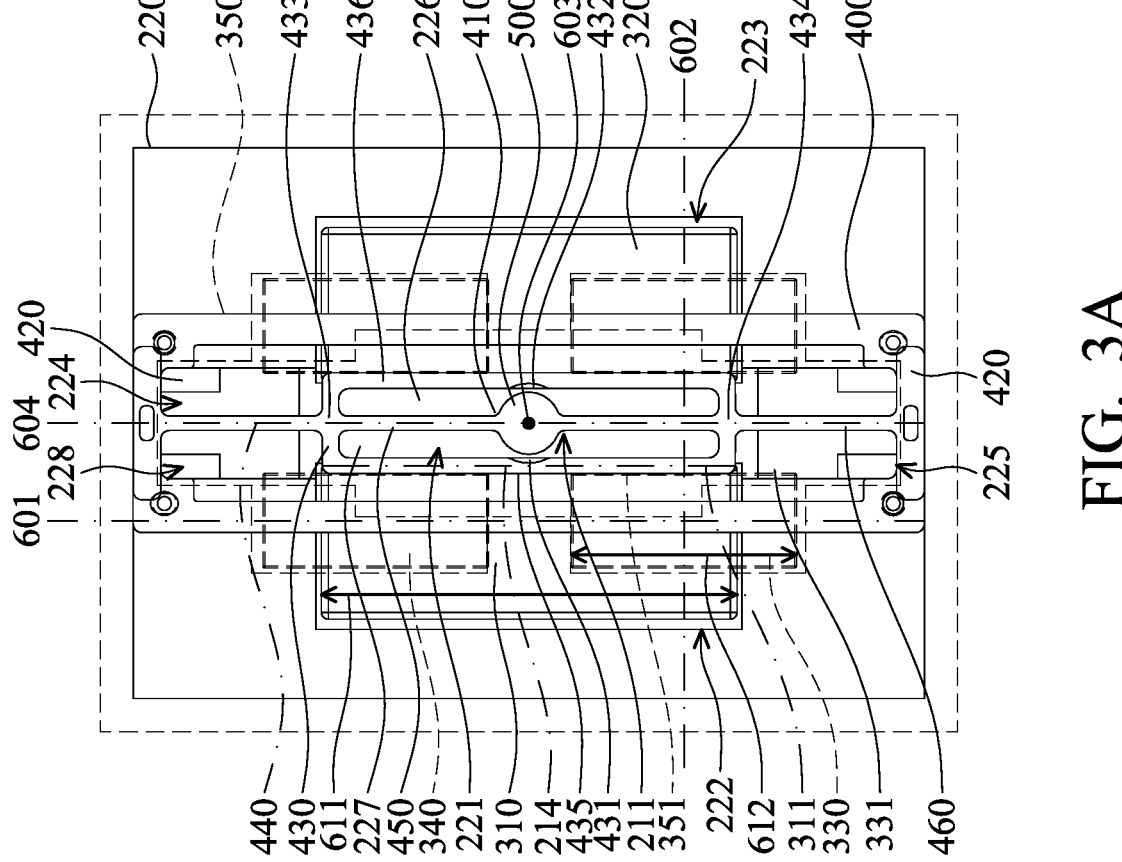
100
220
350
433
436
226
410
500
603
432
320
602
223
434
400
604 | 224
420
601 | 228
440
430
611
227
450
340
221
310
214
435
431
211
351
222
612
311
330
331
460
225   420
FIG. 3A
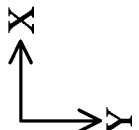
X
Y

210

211

214

215

Z

X

Y

210

213
211

212
214
215

X
Y
Z

OPTICAL ELEMENT DRIVING MECHANISM

CROSS REFERENCE TO RELATED APPLICATIONS

This application claims the benefit of U.S. Provisional Application No. 63/266,034, filed on Dec. 27, 2021, the entirety of which is incorporated by reference herein.

BACKGROUND OF THE INVENTION

Field of the Invention

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical system to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical system and how to increase its durability has become an important issue.

BRIEF SUMMARY OF THE INVENTION

An optical element driving mechanism used for driving an optical element is provided in some embodiments of the present disclosure. The optical element driving mechanism includes a fixed portion and a support assembly. The optical element is movable in a first dimension relative to the fixed portion through the support assembly.

In some embodiments, the driving assembly comprises a coil, a first magnetic element corresponding to the coil, and a second magnetic element corresponding to the coil. The first dimension is rotation relative to a first rotational axis. The first rotational axis is parallel to a first axis. The first magnetic element and the second magnetic element are arranged along a second axis. The second axis is perpendicular to the first axis.

In some embodiments, a winding axis of the coil is parallel to a third axis. The first axis, the second axis, and the third axis are perpendicular with each other. The coil comprises a first segment extending along the first axis and corresponding to the first magnetic element. The first magnetic element comprises a first magnetic element surface facing the second magnetic element. The first segment at least partially overlaps the first magnetic element surface when viewed in a first direction.

In some embodiments, the driving assembly further comprises a third magnetic element corresponding to the coil, and a fourth magnetic element corresponding to the coil. The third magnetic element corresponds to the first segment. The fourth magnetic element corresponds to the first segment.

The third magnetic element and the fourth magnetic element are arranged in a direction that is parallel to the first axis.

In some embodiments, at least a portion of the third magnetic element overlaps the first magnetic element when viewed in the first direction. At least a portion of the fourth magnetic element overlaps the first magnetic element when viewed in the first direction. A third magnetic element surface of the third magnetic element and the first magnetic element surface face in an identical direction. At least a portion of the first segment overlaps the third magnetic element surface when viewed in the first direction.

In some embodiments, the support assembly is between the first magnetic element and the third magnetic element when viewed along the first axis. A center of the first magnetic element and a center of the third magnetic element do not overlap each other when viewed in the first direction. In the first axis, a maximum size of the first magnetic element is different from a maximum size of the third magnetic element. In the second axis, a maximum size of the first magnetic element is different from a maximum size of the third magnetic element. In the third axis, a maximum size of the first magnetic element is different from a maximum size of the third magnetic element.

In some embodiments, in the first axis, the maximum size of the first magnetic element is greater than the maximum size of the third magnetic element. In the second axis, the maximum size of the first magnetic element is greater than the maximum size of the third magnetic element. In the third axis, the maximum size of the first magnetic element is greater than the maximum size of the third magnetic element.

In some embodiments, an N pole and a S pole of the first magnetic element are arranged in a first pole direction. The first pole direction is parallel to the third axis. An N pole and a S pole of the second magnetic element are arranged in a direction parallel to the first pole direction. An N pole and a S pole of the third magnetic element are arranged in a direction parallel to the first pole direction.

In some embodiments, the N pole and the S pole of the second magnetic element are arranged in a direction opposite to the first pole direction. The N pole and the S pole of the third magnetic element are arranged in a direction identical to the first pole direction. At least a portion of the third magnetic element protrudes from the first magnetic element and does not overlap the first magnetic element when viewed in the first direction.

In some embodiments, the support assembly comprises a first fixed end affixed on the optical element, a second fixed end affixed on the fixed portion, an intermediate connecting portion between the first fixed end and the second fixed end, a first resilient portion, wherein the intermediate connecting portion movably connects to the second fixed end through the first resilient portion, a second resilient portion, wherein the first fixed end movably connects to the intermediate connecting portion through the second resilient portion, and a third resilient portion, wherein the intermediate connecting portion movably connects to the second fixed end through the third resilient portion.

In some embodiments, the first resilient portion and the second resilient portion have different elastic coefficients. The support assembly is plate-shaped. The intermediate connecting portion comprises a first portion extending in a direction parallel to the second axis, a second portion extending in the direction parallel to the second axis, a third portion extending in a direction parallel to the first axis, a fourth portion extending in the direction parallel to the first axis, a first dodging portion positioned at the third portion and corresponding to the first fixed end, and a second dodging portion positioned at the fourth portion and corresponding to the first fixed end.

In some embodiments, the intermediate connecting portion surrounds the first fixed end. The first dodging portion has a concave structure. The first dodging portion and the second dodging portion are arranged in a direction parallel to the second axis. The first portion connects to the second portion through the third portion and the fourth portion.

In some embodiments, the fixed portion comprises a bottom and a case affixed on the bottom. The elastic coefficient of the first resilient portion is less than the elastic coefficient of the second resilient portion. The first magnetic element is affixed on the bottom. The third magnetic element is affixed on the case.

In some embodiments, the bottom comprises a first recess, wherein the optical element at least partially overlaps the first recess when viewed in the first direction, a second recess used for accommodating the first magnetic element, a third recess used for accommodating the second magnetic element, a fourth recess, wherein the first resilient portion at least partially overlaps the fourth recess when viewed in the first direction, a fifth recess, wherein the third resilient portion at least partially overlaps the fifth recess when viewed in the first direction, and a first spacing portion between the first magnetic element and the second magnetic element.

In some embodiments, the second recess is formed in the first recess. The third recess is formed in the first recess. The fourth recess is formed in the first recess. The fifth recess is formed in the first recess. A first spacing portion surface of the first spacing portion faces the optical element. A first top surface of the first magnetic element is between the first spacing portion surface and the optical element viewed in along the first axis. The first top surface and the first spacing portion surface face an identical direction. At least a portion of the first spacing portion overlaps the optical element when viewed in the first direction.

In some embodiments, the bottom further comprises a first through hole having a through structure. The coil comprises a lead wire, wherein at least a portion of the lead wire is in the first through hole. The first through hole is formed in the first recess. The first through hole is formed in the fourth recess.

In some embodiments, the optical element driving mechanism further includes a resilient adhesive element. The lead wire movably connects to the bottom through the resilient adhesive element. At least a portion of the resilient adhesive element is in the first through hole.

In some embodiments, the case comprises an opening corresponding to the optical element, a sixth recess used for accommodating the third magnetic element, a seventh recess used for accommodating the fourth magnetic element, a second spacing portion between the third magnetic element and the fourth magnetic element, and a block wall corresponding to the third magnetic element In some embodiments, at least a portion of the third magnetic element overlaps the opening when viewed in the first direction. The sixth recess is adjacent to the opening. The second spacing portion is adjacent to the opening.

In some embodiments, at least a portion of the second spacing portion overlaps the support assembly when viewed in the first direction. The block wall is between the first magnetic element and the third magnetic element. At least a portion of the block wall overlaps the support assembly in the first direction.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 3A and FIG. 3B are perspective views of the optical element driving mechanism viewed in different directions.

DETAILED DESCRIPTION OF THE INVENTION

Figure 1:
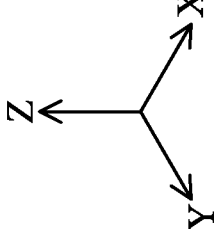
FIG. 1 is a schematic view of an optical element driving mechanism in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
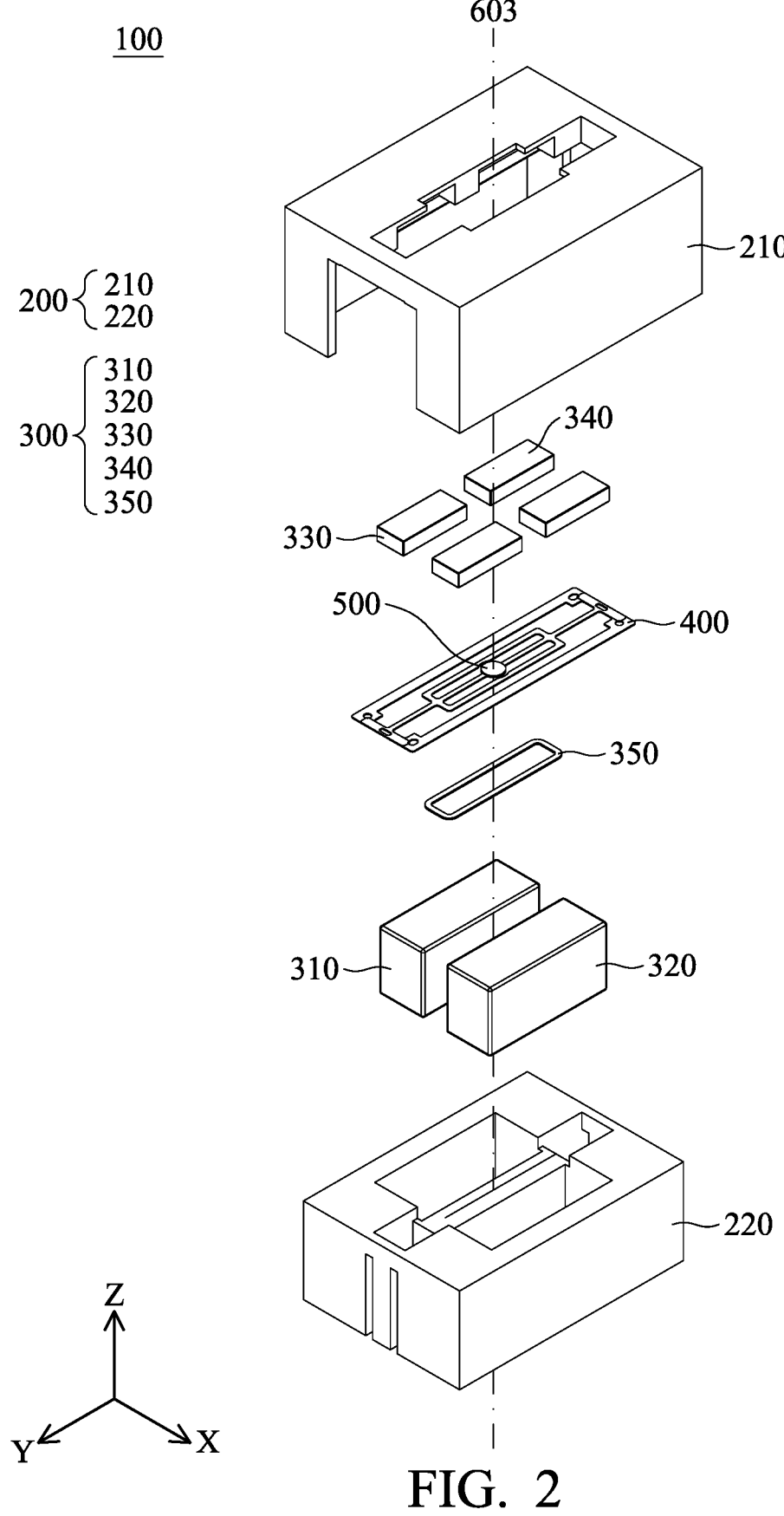
FIG. 2 is an exploded view of the optical element driving mechanism.
Figure 3B:
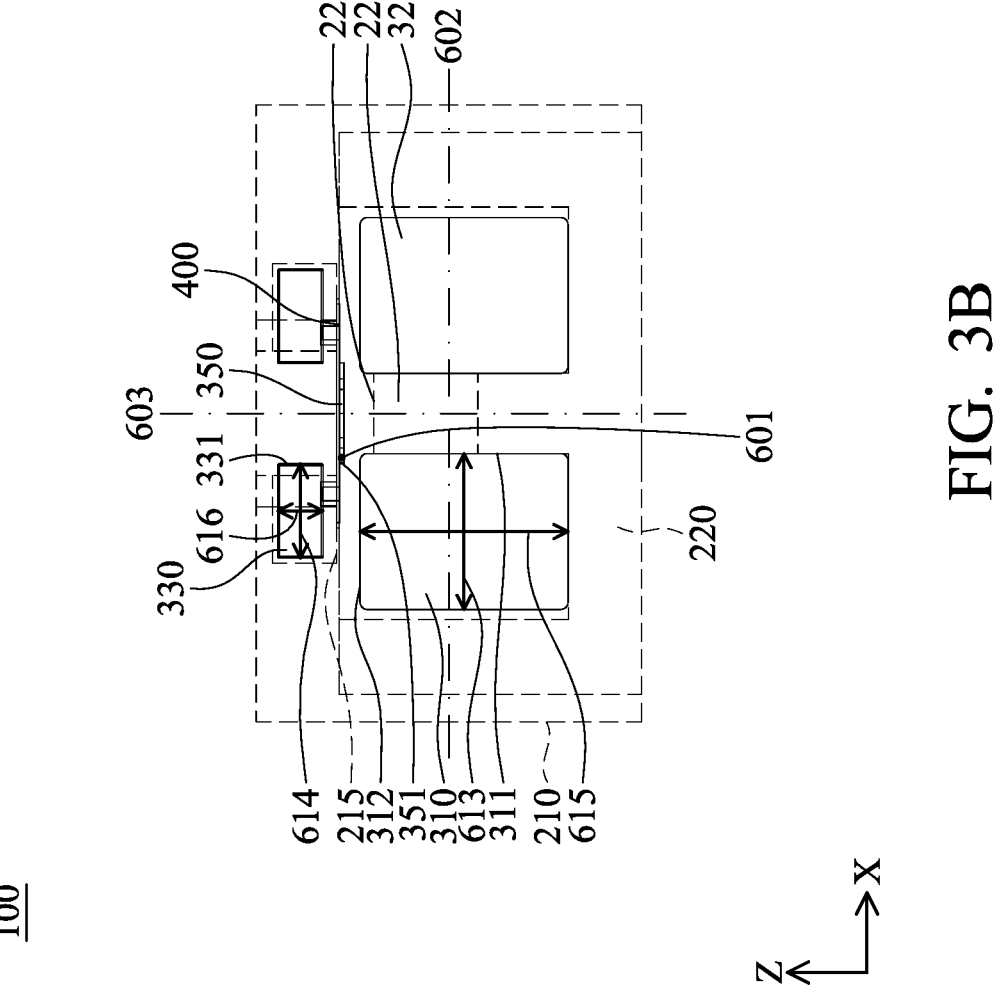

FIG. 1 is a schematic view of an optical element driving mechanism 100 in some embodiments of the present disclosure. FIG. 2 is an exploded view of the optical element driving mechanism 100. FIG. 3A and FIG. 3B are perspective views of the optical element driving mechanism 100 viewed in different directions. As shown in FIG. 1 to FIG. 3B, the optical element driving mechanism 100 may include a fixed portion 200, a driving assembly 300, and a support assembly 400. The optical element driving mechanism 100 may be used for driving a optical element 500.

In some embodiments, the optical element 500 may be, for example, a lens, a mirror, a prism, a reflective polished surface, an optical coating, a beam splitter, an aperture, a liquid lens, an image sensor, a camera module, or a ranging module. It should be noted that the definition of the optical element is not limited to the element that is related to visible light, and other elements that relate to invisible light (e.g., infrared or ultraviolet) are also included in the present disclosure. Therefore, the type and function of the optical element 500 may be different, and suitable optical element 500 may be chosen based on actual requirement.

In some embodiments, the fixed portion 200 may include a case 210 and a bottom 220, wherein the case 210 may be affixed to the bottom 220 to form a housing of the optical element driving mechanism 100, thereby protecting the elements in the optical element driving mechanism 100.

In some embodiments, the driving assembly 300 may include a first magnetic element 310, a second magnetic element 320, a t third magnetic element 330, a t fourth magnetic element 340, and a coil 350. The first magnetic element 310, the second magnetic element 320, the third magnetic element 330, and the fourth magnetic element 340 may be, for example, magnets, may correspond to the coil 350 (such as at least partially overlap each other in the Z direction), thereby generating an electromagnetic driving force, so as to drive the optical element 500 to move relative to the fixed portion 200.

In some embodiments, the support assembly 400 may be disposed between the fixed portion 200 and the optical element 500, and the driving assembly 300 may be disposed on the fixed portion 200 and the support assembly 400, such as the first magnetic element 310, the second magnetic element 320, the third magnetic element 330, and the fourth magnetic element 340 may be disposed on the fixed portion 200, and the coil 350 may be disposed on the support assembly 400, so as to allow the optical element 500 to be movably connected to the fixed portion 200 through the support assembly 400.

In some embodiments, the optical element 500 may move in a first dimension, for example, a movement of rotation with a first rotational axis 604, the first rotational axis 604 can pass through the optical element 500, and can extend in the Y direction. In some embodiments, the coil 350 includes a first section 351 extending along the first axis 601 and corresponding to the first magnetic element 310, the third magnetic element 330, and the fourth magnetic element 340, such as at least partially overlapping each other in the Z direction. In some embodiments, the first axis 601 may be parallel to the first rotational axis 604. In some embodiments, the first magnetic element 310 and the second magnetic element 320 may be arranged along the second axis 602, and the first axis 601 is perpendicular to the second axis 602. In some embodiments, the winding axis of the coil 350 is parallel to the third axis 603, and any two of the first axis 601, the second axis 602 and the third axis 603 may be perpendicular to each other.

In some embodiments, the first magnetic element 310 and the second magnetic element 320 may be affixed on the bottom 220, and the first magnetic element 310 may have a first magnetic element surface 311 facing the second magnetic element 320. As shown in FIG. 3A, when viewed along the first direction (e.g., the Z direction), the first section 351 and the first magnetic element surface 311 may at least partially overlap each other to achieve miniaturization.

In some embodiments, the third magnetic element 330 and the fourth magnetic element 340 may be affixed on the case 210 and may be arranged in the Y direction, such as the third magnetic element 330 and the fourth magnetic element 340 may arrange in a direction parallel to the first axis 601. As shown in FIG. 3A, when viewed along a first direction (for example, the Z direction), the third magnetic element 330 and the fourth magnetic element 340 may at least partially overlap the first magnetic element 310 to reduce the size in other directions for achieving miniaturization. The third magnetic element 330 may include a third magnetic element surface 331 facing the same direction as the first magnetic element surface 311. When viewed along the first direction, the first section 351 and the third magnetic element surface 331 may also at least partially overlap each other. In some embodiments, when viewed along the first direction, the third magnetic element 330 may at least partially protrude from the first magnetic element 310 and does not overlap with the first magnetic element 310.

In some embodiments, as shown in FIG. 3B, when viewed along the first axis 601, the support assembly 400 may be located between the first magnetic element 310 and the third magnetic element 330. That is to say, the first magnetic element 310 and the second magnetic element 320 may be located on one side of the support assembly 400, while the third magnetic element 330 and the fourth magnetic element 340 may be located on the other side of the support assembly 400.

In some embodiments, in the direction in which the first axis 601 extends, the first magnetic element 310 may have a size 611, while the third magnetic element 330 may have a size 612, and the size 611 and the size 612 may be different from each other, such has the size 611 may be greater than the size 612. In some embodiments, in the direction in which the second axis 602 extends, the first magnetic element 310 may have a size 613, the third magnetic element 330 may have a size 614, and the size 613 and the size 614 may be different from each other, such as the size 613 may be greater than the size 614. In some embodiments, in the direction in which the third axis 603 extends, the first magnetic element 310 may have a size 615, the third magnetic element 330 may have a size 616, and the size 615 and the size 616 may be different, such the size 615 may be greater than the size 616 to allow the first magnetic element 310 providing a greater electromagnetic driving force.

In some embodiments, the N pole and the S pole of the first magnetic element 310 may be arranged along a first pole direction (e.g., the Z direction), and the first pole direction may be parallel to the third axis 603. In addition, the arrangement directions of the N poles and S poles of the second magnetic element 320 and the third magnetic element 330 may be parallel to the aforementioned first pole direction, and the N poles and S poles of the second magnetic element 320 and the third magnetic element 330 may arranged in directions different from each other. For example, the arrangement direction of the N pole and S pole of the second magnetic element 320 may be opposite to the first pole direction, and the arrangement direction of the N pole and S pole of the third magnetic element 330 may be the same as the first pole direction. In this way, the optical element 500 may be controlled to rotate in a specific direction by the driving assembly 300.

In some embodiments, the support assembly 400 may be plate-shaped, and may include a first fixed end 410, a second fixed end 420, an intermediate connecting portion 430, a first resilient portion 440, a second resilient portion 450, and a third resilient portion 460. The first fixed end 410 may be affixed to the optical element 500, and the second fixed end 420 may be affixed to the fixed portion 200, such as being connected to the case 210 and the bottom 220. The intermediate connecting portion 430 may be located between the first fixed end 410 and the second fixed end 420 and may surround the first fixed end 410 and the second resilient portion 450, and may have a first portion 433 and a second portion 434 extending in a direction parallel to the second axis 602 (such as the X direction) and a third portion 435 and a fourth portion 436 extending in a direction parallel to the first axis 601 (such as the Y direction). The first portion 433 may be connected to the second portion 434 through the third portion 435 and the fourth portion 436. There may be a first dodging portion 431 on the third portion 435 and a second dodging portion 432 on the fourth portion 436. The first dodging portion 431 and the second dodging portion 432 may correspond to the first fixed end 410, such as may have a concave structure, and may be arranged in a direction parallel to the second axis 602 (e.g., the X direction). Thereby, the optical element 500 may be prevented from colliding with the intermediate connecting portion 430 when the optical element 500 is rotating.

In some embodiments, the intermediate connecting portion 430 may be movably connected to the second fixed end 420 via the first resilient portion 440 and the third resilient portion 460, and the first fixed end 410 may be movably connected to the intermediate connecting portion 430 via the second resilient portion 450, such as connected to the first portion 433. The first resilient portion 440 and the second resilient portion 450 may have different elastic coefficients, such as the elastic coefficient of the first resilient portion 440 may be less than the elastic coefficient of the second resilient portion 450, that is to say, the first resilient portion 440 may be softer than the second resilient portion 450, thereby allowing the intermediate connecting portion 430 and the optical element 500 to rotate at different frequencies, so that the optical element 500 may be driven by resonance.

Figure 4A:
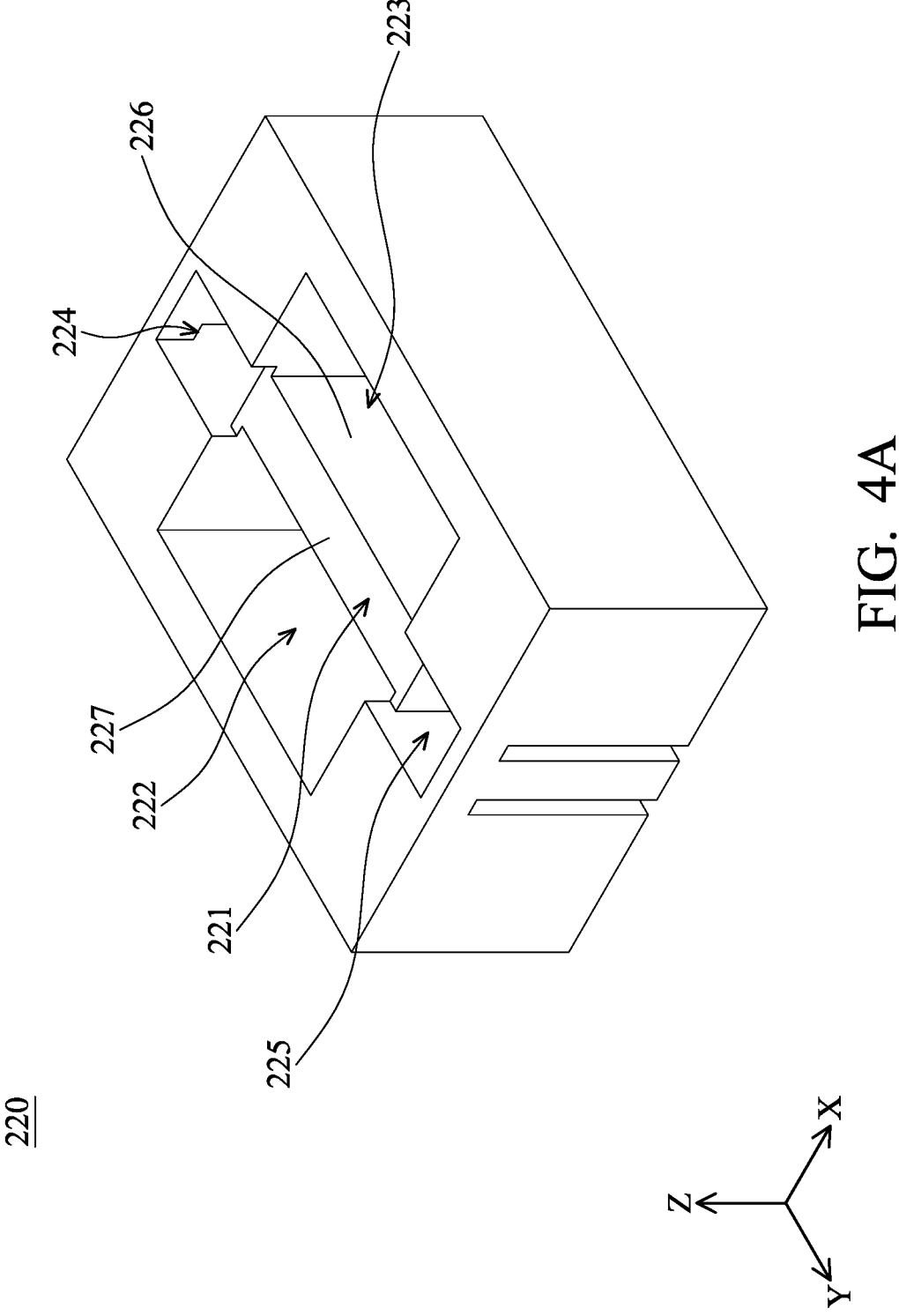
FIG. 4A and FIG. 4B are schematic views of the bottom viewed from different directions.
Figure 4B:
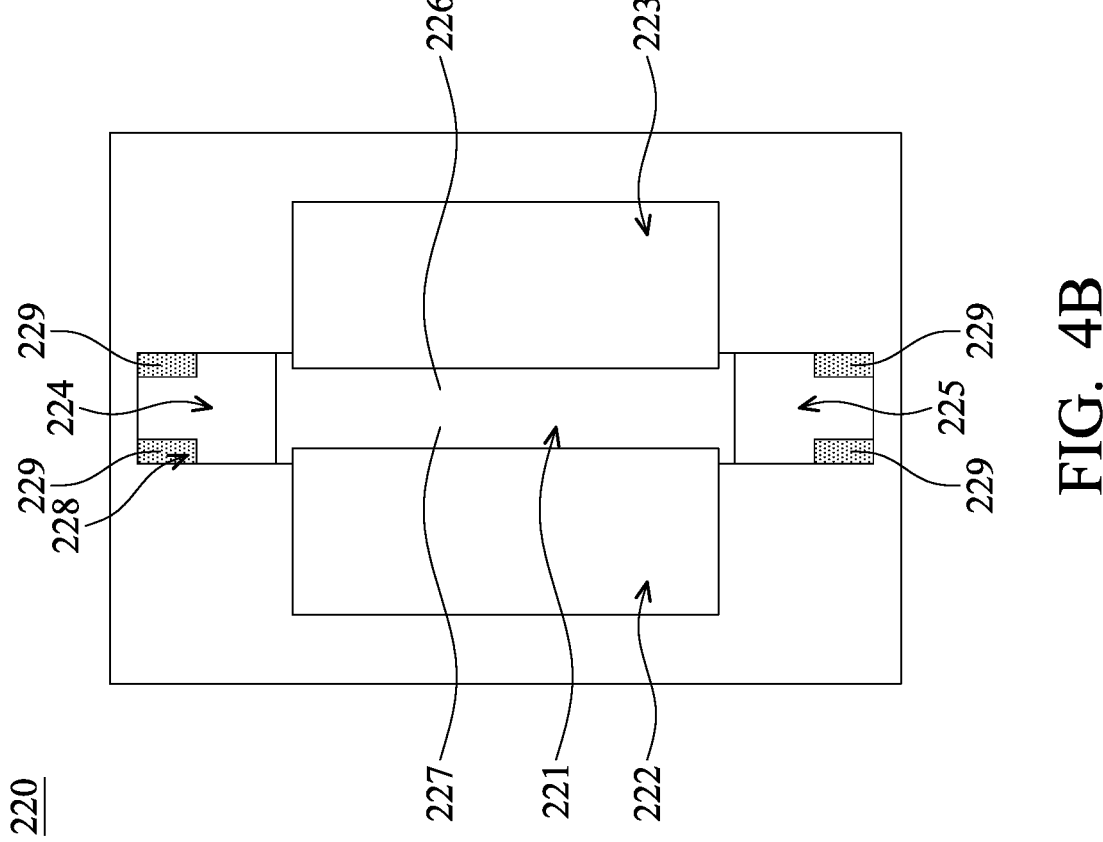

FIG. 4A and FIG. 4B are schematic views of the bottom 220 viewed from different directions. In some embodiments, the bottom 220 may include a first recess 221, a second recess 222, a third recess 223, a fourth recess 224, and a fifth recess 225, wherein the second recess 222, the third recess 223, the fourth recess 224, and the fifth recess 225 may be formed in the first recess 221. When viewed along the first direction (Z direction), the optical element 500 at least partially overlaps the first recess 221. The second recess 222 may be used to accommodate the first magnetic element 310, and the third recess 223 may be used to accommodate the second magnetic element 320. When viewed along the first direction, the first resilient portion 440 may at least partially overlap the fourth recess 224, and the third resilient portion 460 may at least partially overlap the fifth recess 225 to provide space for the first resilient portion 440 and the third resilient portion 460 to move, so as to avoid damage to the support assembly 400 when the optical element driving mechanism 100 is in operation.

In some embodiments, the bottom 220 may also include a first spacing portion 226 located between the first magnetic element 310 and the second magnetic element 320 to separate the first magnetic element 310 and the second magnetic element 320, so as to avoid magnetic interference. In some embodiments, a first spacing portion surface 227 of the first spacing portion 226 may face the optical element 500. That is to say, when viewed along the first direction, the first spacing portion 226 may at least partially overlap with the optical element 500. In some embodiments, the first top surface 312 of the first magnetic element 310 may be located between the first spacing portion surface 227 and the optical element 500 in the Z direction when viewed along the first axis 601, and the first top surface 312 and the first spacing portion surface 227 may face in the same direction.

In some embodiments, the bottom 220 may also have a first through hole 228 formed in the first recess 221 and the fourth recess 224, and has a through structure. The first through hole 228 may be used to accommodate the lead wire (not shown) of the coil 350, that is to say, the lead wire of the coil 350 may be at least partially located in the first through hole 228, so as to be electrically connected to other external elements (such as circuit boards) from the first through hole 228. In some embodiments, the lead wire may be movably connected to the bottom 220 via a resilient adhesive element 229, and the resilient adhesive element 229 may be gel, and the resilient adhesive element 229 may be at least partially located in the first through hole 228. In some embodiments, the resilient adhesive element 229 may also be partially located outside the first through hole 228.

Figure 5A:
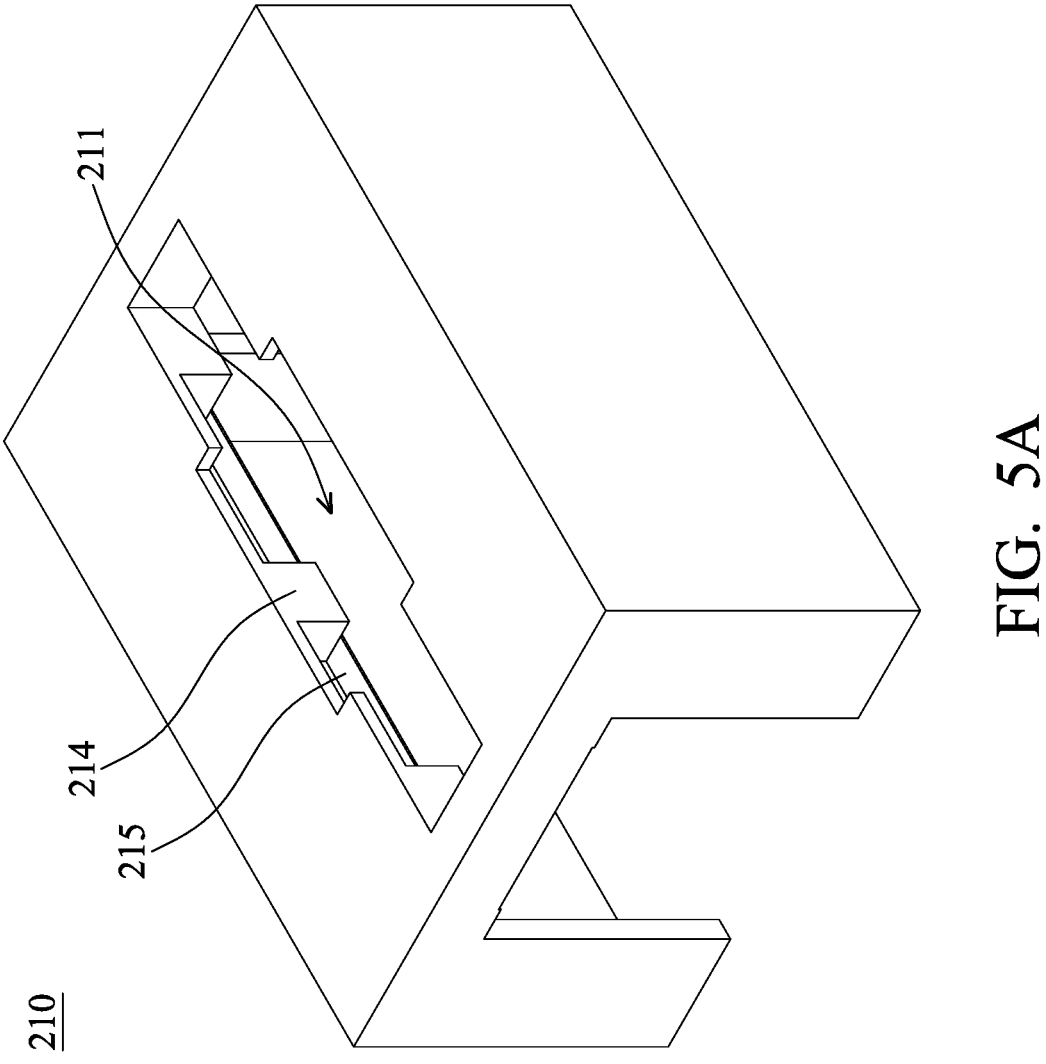
FIG. 5A, FIG. 5B, and FIG. 5C are schematic views of the case viewed from different directions.
Figure 5A:
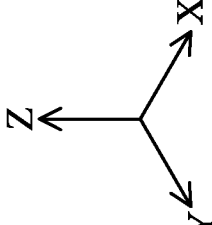
Figure 5B:
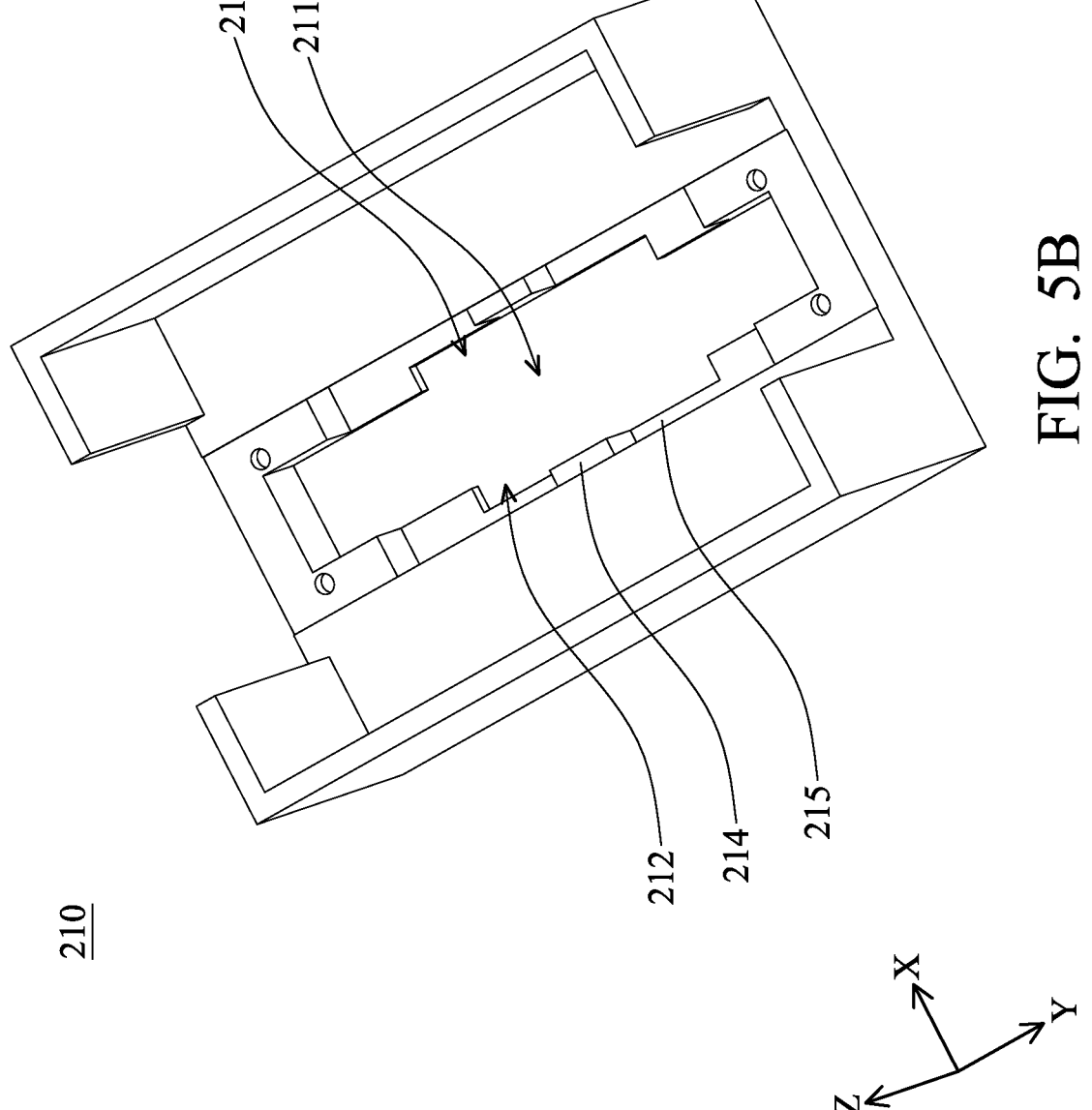
Figure 5C:
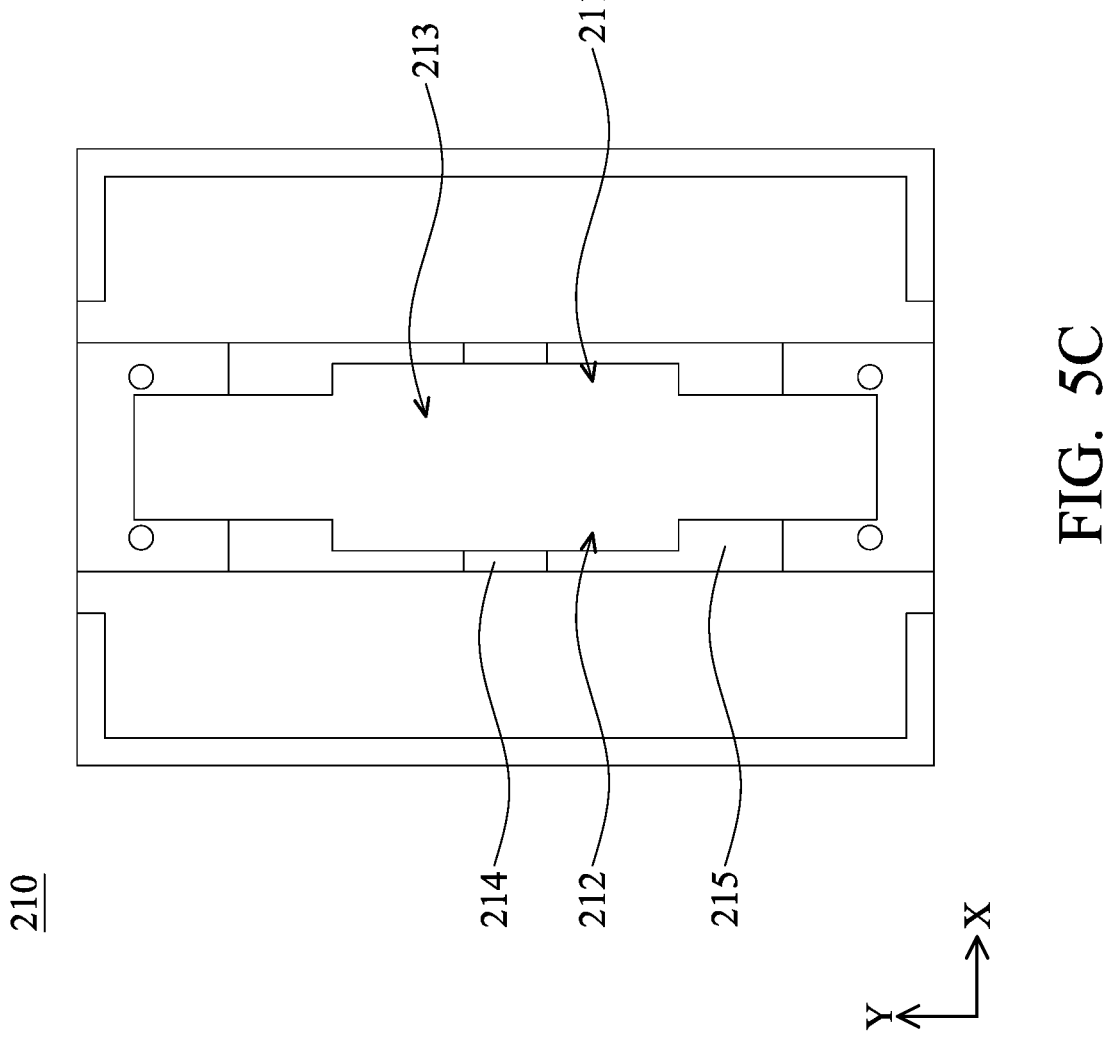

FIG. 5A, FIG. 5B, and FIG. 5C are schematic views of the case 210 viewed from different directions. In some embodiments, the case 210 may include an opening 211, a sixth recess 212, a seventh recess 213, a second spacing portion 214, and a block wall 215. The opening 211 may correspond to the optical element 500, such as when viewed from the Z direction, the optical element 500 may be exposed from the opening 211. In addition, the third magnetic element 330 may at least partially overlap the opening 211, that is, at least a portion of the third magnetic element 330 may be exposed from the opening 211. The sixth recess 212, the seventh recess 213, and the second spacing portion 214 may be adjacent to the opening 211, and the sixth recess 212 may be used to accommodate the third magnetic element 330, and the seventh recess 213 may be used to accommodate the fourth magnetic element 340.

In some embodiments, the second spacing portion 214 may be located between the third magnetic element 330 and the fourth magnetic element 340 to separate the third magnetic element 330 and the fourth magnetic element 340 for avoiding magnetic interference. In addition, the block wall 215 may be located between the first magnetic element 310 and the third magnetic element 330 and corresponds to the third magnetic element 330, to separate the first magnetic element 310 and the third magnetic element 330 for avoiding magnetic interference. When viewed in the first direction, the second spacing portion 214 and the support assembly 400 may at least partially overlap with each other. When viewed along the first axis 601, the block wall 215 and the support assembly 400 may also at least partially overlap each other in the Z direction, so as to reduce the size in other directions and achieve miniaturization.

In some embodiments, the optical element driving mechanism 100 may also be matched with other optical element driving mechanisms to deflect light paths in multiple dimensions, thereby achieving functions such as detection, scanning, and projection.

In summary, an optical element driving mechanism is provided and used for driving a first optical element. The optical element driving mechanism includes a fixed portion and a first driving assembly. The first driving assembly is used for driving the first optical element to move relative to the fixed portion in a first dimension. Therefore, functions like detection, scanning, and projection may be achieved, and miniaturization may be achieved as well.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism used for driving an optical element, comprising:
   a fixed portion;
   a support assembly, wherein the optical element is movable relative to the fixed portion in a first dimension through the support assembly, and the support assembly comprises:
   a first fixed end affixed on the optical element;
   a second fixed end affixed on the fixed portion;
   an intermediate connecting portion between the first fixed end and the second fixed end, comprising:
      a third portion extending in a direction parallel to the first axis;
      a fourth portion extending in the direction parallel to the first axis;
      a first dodging portion positioned at the third portion and corresponding to the first fixed end; and a second dodging portion positioned at the fourth portion and corresponding to the first fixed end, wherein in a top view, the optical element is disposed between the first dodging portion and the second dodging portion, and the first dodging portion and the second dodging portion recessed in directions away from the optical element;
   a first resilient portion, wherein the intermediate connecting portion movably connects to the second fixed end through the first resilient portion;
   a second resilient portion, wherein the first fixed end movably connects to the intermediate connecting portion through the second resilient portion;
   a third resilient portion, wherein the intermediate connecting portion movably connects to the second fixed end through the third resilient portion; and
   a driving assembly configured to drive the support assembly relative to the fixed portion.

2. The optical element driving mechanism as claimed in claim 1,
   wherein the driving assembly comprises:
   a coil;
   a first magnetic element corresponding to the coil; and
   a second magnetic element corresponding to the coil;
   wherein:
   the first dimension is rotation relative to a first rotational axis;
   the first rotational axis is parallel to a first axis;
   the first magnetic element and the second magnetic element are arranged along a second axis; and
   the second axis is perpendicular to the first axis.

3. The optical element driving mechanism as claimed in claim 2, wherein:
   a winding axis of the coil is parallel to a third axis;
   the first axis, the second axis, and the third axis are perpendicular with each other;
   the coil comprises a first segment extending along the first axis and corresponding to the first magnetic element;
   the first magnetic element comprises a first magnetic element surface facing the second magnetic element; and
   the first segment at least partially overlaps the first magnetic element surface when viewed in a first direction.

4. The optical element driving mechanism as claimed in claim 3, wherein the driving assembly further comprises:
   a third magnetic element corresponding to the coil; and
   a fourth magnetic element corresponding to the coil;
   wherein:
   the third magnetic element corresponds to the first segment;
   the fourth magnetic element corresponds to the first segment; and
   the third magnetic element and the fourth magnetic element are arranged in a direction that is parallel to the first axis.

5. The optical element driving mechanism as claimed in claim 4, wherein:
   at least a portion of the third magnetic element overlaps the first magnetic element when viewed in the first direction;
   at least a portion of the fourth magnetic element overlaps the first magnetic element when viewed in the first direction;
   a third magnetic element surface of the third magnetic element and the first magnetic element surface face in an identical direction; and at least a portion of the first segment overlaps the third magnetic element surface when viewed in the first direction.

6. The optical element driving mechanism as claimed in claim 5, wherein:

the support assembly is between the first magnetic element and the third magnetic element when viewed along the first axis;

a center of the first magnetic element and a center of the third magnetic element do not overlap each other when viewed in the first direction;

in the first axis, a maximum size of the first magnetic element is different from a maximum size of the third magnetic element;

in the second axis, a maximum size of the first magnetic element is different from a maximum size of the third magnetic element; and in the third axis, a maximum size of the first magnetic element is different from a maximum size of the third magnetic element.

7. The optical element driving mechanism as claimed in claim 6, wherein:

in the first axis, the maximum size of the first magnetic element is greater than the maximum size of the third magnetic element;

in the second axis, the maximum size of the first magnetic element is greater than the maximum size of the third magnetic element; and in the third axis, the maximum size of the first magnetic element is greater than the maximum size of the third magnetic element.

8. The optical element driving mechanism as claimed in claim 7, wherein:

an N pole and a S pole of the first magnetic element are arranged in a first pole direction;

the first pole direction is parallel to the third axis;

an N pole and a S pole of the second magnetic element are arranged in a direction parallel to the first pole direction; and an N pole and a S pole of the third magnetic element are arranged in a direction parallel to the first pole direction.

9. The optical element driving mechanism as claimed in claim 8, wherein:

the N pole and the S pole of the second magnetic element are arranged in a direction opposite to the first pole direction;

the N pole and the S pole of the third magnetic element are arranged in a direction identical to the first pole direction; and at least a portion of the third magnetic element protrudes from the first magnetic element and does not overlap the first magnetic element when viewed in the first direction.

10. The optical element driving mechanism as claimed in claim 9, wherein:

the first resilient portion and the second resilient portion have different elastic coefficients;

the support assembly is plate-shaped; and the intermediate connecting portion further comprises:

a first portion extending in a direction parallel to the second axis;

a second portion extending in the direction parallel to the second axis.

11. The optical element driving mechanism as claimed in claim 10, wherein:

the intermediate connecting portion surrounds the first fixed end;

the first dodging portion has a concave structure;

the first dodging portion and the second dodging portion are arranged in a direction parallel to the second axis; and the first portion connects to the second portion through the third portion and the fourth portion.

12. The optical element driving mechanism as claimed in claim 11, wherein the fixed portion comprises:

a bottom; and a case affixed on the bottom;

wherein:

the elastic coefficient of the first resilient portion is less than the elastic coefficient of the second resilient portion;

the first magnetic element is affixed on the bottom; and the third magnetic element is affixed on the case.

13. The optical element driving mechanism as claimed in claim 12, wherein the bottom comprises:

a first recess, wherein the optical element at least partially overlaps the first recess when viewed in the first direction;

a second recess used for accommodating the first magnetic element;

a third recess used for accommodating the second magnetic element;

a fourth recess, wherein the first resilient portion at least partially overlaps the fourth recess when viewed in the first direction;

a fifth recess, wherein the third resilient portion at least partially overlaps the fifth recess when viewed in the first direction; and a first spacing portion between the first magnetic element and the second magnetic element.

14. The optical element driving mechanism as claimed in claim 13, wherein:

the second recess is formed in the first recess;

the third recess is formed in the first recess;

the fourth recess is formed in the first recess;

the fifth recess is formed in the first recess;

a first spacing portion surface of the first spacing portion faces the optical element;

a first top surface of the first magnetic element is between the first spacing portion surface and the optical element viewed in along the first axis;

the first top surface and the first spacing portion surface face an identical direction; and at least a portion of the first spacing portion overlaps the optical element when viewed in the first direction.

15. The optical element driving mechanism as claimed in claim 14, wherein:

the bottom further comprises a first through hole having a through structure;

the coil comprises a lead wire, wherein at least a portion of the lead wire is in the first through hole;

the first through hole is formed in the first recess; and the first through hole is formed in the fourth recess.

16. The optical element driving mechanism as claimed in claim 15, further comprising a resilient adhesive element;

wherein:

the lead wire movably connects to the bottom through the resilient adhesive element; and at least a portion of the resilient adhesive element is in the first through hole.

17. The optical element driving mechanism as claimed in claim 16, wherein the case comprises:

an opening corresponding to the optical element;

a sixth recess used for accommodating the third magnetic element;

a seventh recess used for accommodating the fourth magnetic element;

a second spacing portion between the third magnetic element and the fourth magnetic element; and a block wall corresponding to the third magnetic element.

18. The optical element driving mechanism as claimed in claim 17, wherein:

at least a portion of the third magnetic element overlaps the opening when viewed in the first direction;

the sixth recess is adjacent to the opening; and the second spacing portion is adjacent to the opening.

19. The optical element driving mechanism as claimed in claim 18, wherein:

at least a portion of the second spacing portion overlaps the support assembly when viewed in the first direction;

the block wall is between the first magnetic element and the third magnetic element; and at least a portion of the block wall overlaps the support assembly in the first direction.

\* \* \* \* \*